United States Patent
Nakamura et al.

(10) Patent No.: US 8,477,397 B2
(45) Date of Patent: Jul. 2, 2013

(54) PRINT DATA GENERATING CONFIGURATION THAT ENABLES AN IMAGE PRINT TO HAVE A TOLERANCE FOR IMAGE QUALITY DEGRADATION AGAINST VARIATIONS OF PRINT CHARACTERISTICS BETWEEN PRINTING ELEMENTS OF A PRINT HEAD

(75) Inventors: Hironori Nakamura, Kawasaki (JP);
Hiroki Horikoshi, Komae (JP);
Yasunori Fujimoto, Inagi (JP); Shinichi Miyazaki, Kawasaki (JP); Akira Ichimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 12/640,741

(22) Filed: Dec. 17, 2009

(65) Prior Publication Data

US 2010/0165390 A1  Jul. 1, 2010

(30) Foreign Application Priority Data

Dec. 25, 2008  (JP) .................................. 2008-329966

(51) Int. Cl.
*G03F 3/08* (2006.01)
(52) U.S. Cl.
USPC ......................................................... 358/521
(58) Field of Classification Search
USPC ......................................................... 358/521
See application file for complete search history.

(56) References Cited

U.S. PATENT DOCUMENTS

| | | | |
|---|---|---|---|
| 5,818,474 A | 10/1998 | Takahashi et al. | 347/15 |
| 6,042,212 A | 3/2000 | Takahashi et al. | 347/15 |
| 6,491,372 B1 | 12/2002 | Shioya et al. | 347/41 |
| 6,511,143 B1 | 1/2003 | Ishikawa et al. | 347/9 |
| 6,511,146 B2 | 1/2003 | Ishikawa et al. | 347/15 |
| 6,779,872 B2 | 8/2004 | Shioya et al. | 347/41 |
| 6,834,927 B2 | 12/2004 | Yashima et al. | |
| 2002/0039192 A1 | 4/2002 | Otsuka et al. | |
| 2002/0122087 A1 | 9/2002 | Ishikawa et al. | 347/15 |
| 2003/0025757 A1 | 2/2003 | Shioya et al. | 347/41 |
| 2007/0236526 A1 | 10/2007 | Noguchi et al. | |
| 2008/0137146 A1 | 6/2008 | Marumoto | |

FOREIGN PATENT DOCUMENTS

| | | |
|---|---|---|
| JP | 06-191041 | 7/1994 |
| JP | 07-052390 | 2/1995 |
| JP | 2000-103088 | 4/2000 |
| JP | 2006-231736 | 9/2006 |

OTHER PUBLICATIONS

Communication Appln. No. 09015905.4-1228/2202955, European Patent Office, dated Nov. 19, 2010.
Office Action in European Patent Application. No. 09 015 905.4-1228, issued Dec. 22, 2011, by the European Patent Office.

*Primary Examiner* — Eric A Rust
(74) *Attorney, Agent, or Firm* — Fitzpatrick, Cella, Harper & Scinto

(57) ABSTRACT

A channel selection section selects whether the subsequent processing to the image data is executed by image distribution precedence processing or by gradation lowering precedence processing in accordance with channel information of the image data. That is, in regard to the channels of C, M and K with relatively high density among inks, the image distribution precedence processing excellent in robustness is selected. On the other hand, in the ink of the color with high brightness or low density, even if the print position of the dot is shifted, the density change due to this shift is not so much large. It is possible to restrict an increase in the processing load due to executing the gradation lowering processing after the distribution processing to each of the plural divided images by thus not selecting the image distribution precedence processing in consideration of the robustness.

15 Claims, 15 Drawing Sheets

BINARY DATA BEFORE FILTERING

DATA AFTER FILTERING

| 1/16 | 2/16 | 1/16 |
|---|---|---|
| 2/16 | 4/16 | 2/16 |
| 1/16 | 2/16 | 1/16 |

FIG.14A

| 16 | 32 | 16 |
|---|---|---|
| 32 | 64 | 32 |
| 16 | 32 | 16 |

FIG.14B

PRINT DATA GENERATING CONFIGURATION THAT ENABLES AN IMAGE PRINT TO HAVE A TOLERANCE FOR IMAGE QUALITY DEGRADATION AGAINST VARIATIONS OF PRINT CHARACTERISTICS BETWEEN PRINTING ELEMENTS OF A PRINT HEAD

BACKGROUND OF THE INVENTION

1. Field of the Invention

The present invention relates to an image processing apparatus, a printing apparatus, and an image processing method, and particularly, to a print data generating configuration that enables an image print to have a tolerance for image quality degradation against variations of print characteristics between printing elements of a print head, a fluctuation in scanning of the print head, a conveying error of a print medium and the like.

2. Description of the Related Art

As an example of a printing system using a print head provided with a plurality of printing elements, there is known an inkjet print system which ejects ink from an ejection opening as the printing element to form dots on a print medium. Such an inkjet printing apparatus is classified into a full line type and a serial type depending particularly on a difference in construction of the print head.

The full line type printing apparatus is provided with the print head which includes printing elements arranged over a range corresponding to a width of the print medium conveyed and is used in a fixed state at printing. The print medium is conveyed in a direction, which intersects the array direction of the printing elements, relative to the print head used in the fixed state and ink is ejected to the print medium in a predetermined frequency from the print head to form an image. Such a full line type printing apparatus can form the image at a relatively high speed and is suitable for office use. On the other hand, in the serial type printing apparatus, a print head scans a print medium, ink is ejected thereon at a predetermined frequency during the scanning, and a conveying operation conveying the print medium in a direction intersecting with the scanning direction of the print head is performed for each scan to form an image. Such a serial type printing apparatus can be manufactured in a relatively small size and at low costs and is suitable for personal use.

In any of these full line type and serial type printing apparatuses, a plurality of printing elements arranged in the print head contain a certain degree of variations in the manufacturing process. These variations appear as variations of ejection characteristics such as an ejection amount or an ejection direction of ink to produce irregular shapes of dots formed on the print medium, as a result possibly creating uneven density or stripes on an image.

For overcoming this problem, a so-called multi-pass printing system is employed in the serial type inkjet printing apparatus, for example. In the multi-pass printing, pixels to which the print head can perform printing in one-time printing main scan are distributed to a plurality of scans of the print head between which a conveying operation of the print medium is performed so as to make different printing elements used in the plurality of scans for performing the printing operation. This allows the variations in ejection characteristics in the plurality of the printing elements to be dispersed into the plurality of scans for completing the image, enabling the uneven density to be indistinctive. This multi-pass print system can be also applied to the full line type printing apparatus.

As shown in FIG. 1, two lines of printing elements in regard to ink of the same color are arranged in a conveying direction of the print medium, thereby enabling the dot line formed in the conveying direction to be shared and printed by the two printing element lines. As a result, the variation of the printing elements in one printing element line is dispersed into ½, enabling the uneven density due to the variation to be indistinctive.

In a case of performing the multi-pass printing, print data of the image are distributed into plural times of printing scans or a plurality of print heads (printing element lines) for completing the image. Conventionally most of the times this distribution is carried out by using a mask pattern in which a pixel ("1") permitting printing a dot and a pixel ("0") not permitting printing a dot are in advance defined corresponding to an individual printing element.

FIG. 2 is a diagram showing an example of a mask pattern used in a multi-pass print for completing a printing by two times of scans (hereinafter, also called "pass") in the serial system. In FIG. 2, black areas each show a pixel ("1") permitting printing of a dot and white areas each show a pixel ("0") not permitting printing of a dot, and number 501 denotes a mask pattern used in a scan of first pass and number 502 denotes a mask pattern used in a scan of second pass. The pattern 501 and the pattern 502 are complementary with each other in regard to print permitting pixels (or print non-permitting pixels), and therefore, dots constituting an image to be completed are formed in any one of the first pass and second pass. Specifically, in regard to print data of the image to be completed, a logical product is carried out for each pixel between image data to be completed and the above patterns and thus the result becomes binary data according to which respective printing elements actually executes printing in each pass.

However, an arrangement of the print data ("1") in the pixels according to which printing is performed varies depending on the image to be printed. Therefore, it is difficult to always evenly distribute such a print data to the plurality of scans or plurality of printing element lines by using a mask pattern in which a pattern of the print permitting pixels is previously defined. Thus, a particular scan or a particular printing element line may print a high ratio of dots, and as a result, the ejection characteristic of the particular scan or of the particular printing element line appears in the image to decrease the original advantage of the multi-pass printing. Accordingly, in the multi-pass printing, how equally and evenly the print data are distributed into the plural scans or the plural printing element lines is one of important issues.

For example, Japanese Patent Laid-Open No. H07-052390 (1995) describes a method of producing a mask pattern in which print permitting pixels and print non-permitting pixels are arranged at a random. By using this random mask pattern, the print data can be expected to be distributed substantially equally to the plural scans and the plural printing element lines even in the print data of any image.

In addition, Japanese Patent Laid-Open No. H06-191041 (1994) describes a method in which the fixed mask pattern as shown in FIG. 2 is not used, but print data ("1") of plural pixels to be printed continuously in a main scan direction or in a sub scan direction are distributed to be printed in different scans as many as possible.

FIG. 3 is diagrams showing an arrangement of print pixels of binary image data and the result in which the print pixels are distributed to two scans according to the method described in Japanese Patent Laid-Open No. H06-191041 (1994). In this way, the dots continuous in a main scan direction and in a sub scan direction are distributed equally to different scans. Thereby, not only image degradation due to variations in ejection characteristics of the printing element, but also defects such as ink overflow can be effectively reduced.

Even if the above multi-pass system is employed, under recent situations where a higher-quality printing is demanded, a density change or an uneven density due to a shift of a print position (registration) in a scan unit or in a nozzle line unit is seen newly as a problem. The shift of the print position in the scan unit or in the nozzle line unit is caused by fluctuations in distance between the print medium and the ejection opening surface (distance from a sheet), fluctuations of a conveying amount of the print medium or the like, and appears as a shift between planes of image printed in respective scans (or by respective nozzle lines).

For example, there will be considered a case where in an example shown in FIG. 3, a plane of dots (one circle) printed in the precedent scan and a plane of dots (double circle) printed in the subsequent scan are shifted by an amount corresponding to one pixel from each other in any one of a main scan direction and a sub scan direction. In this case, the dots (one circle) printed in the precedent scan and the dots (double circle) printed in the subsequent scan completely overlap to generate white areas on the print medium, and the white areas lower the density of image. Even in a case where the shift is not as large as one pixel, the fluctuations in the distance between the neighboring dots and the overlapped portion have a large impact on a coverage of dots to the white areas of the print medium, finally on the image density. Specifically, when the shift between the planes changes with the fluctuation in the distance between the print medium and the ejection opening surface (the distance from a sheet) or the fluctuation in the conveying amount of the print medium, the density of the uniform image also changes with these fluctuations, which results in being recognized as density unevenness.

Therefore, there is a demand for a method of producing print data in the multi-pass printing in which even if the print position shift occurs between the planes, the image quality is not remarkably deteriorated due to the position shift. In the present specification, regardless of fluctuations in any printing condition, a tolerance property that shows how hard to produce the density change or the uneven density due to the print position shift even if the print position shift between the planes occurs due to the fluctuation are called a "robustness".

Japanese Patent Laid-Open No. 2000-103088 describes a method of producing print data for enhancing the above robustness. More specifically, this producing method has paid attention on a fact that the fluctuation in the image density due to the print position shift is, as described in detail in FIG. 3, caused by that binary print data distributed to plural times of scans or plural nozzle lines are completely complementary with each other. For reducing the extent of the above complementarity, the distribution of the image data to the plural times of the scans or the plural nozzle lines is carried out in a state of multi-valued data before binarizing and the multi-valued data after distributed are independently binarized.

FIG. 4 is a block diagram showing a control configuration example for realizing data distribution described in Japanese Patent Laid-Open No. 2000-103088. This figure shows an example of distributing print data to two print heads (two nozzle lines). Multi-valued image data received from a host computer 2001 are subject to various kinds of image processing (2004 to 2006), and thereafter, a multi value SMS section 2007 generates data for a first print head and data for a second print head based on the data that has been subjected to the various kinds of image processing. Specially the same multi-valued image data to which the image processing has been executed are prepared as the data for the first print head and the data for the second print head. In a first data conversion section 2008 and a second data conversion section 2009, conversion processing is executed using respective distribution coefficients. For example, a distribution coefficient of 0.55 is used to the data for the first print head and a distribution coefficient of 0.45 is used to the data for the second print head to execute the conversion processing. In consequence, the content of binarization processing to be executed later can be made different between the data for the first print head and the data for the second print head. Then, as described later in FIG. 5, overlaps of dots by the first print head and dots by the second print head finally formed can be generated in a certain ratio. It should be noted that Japanese Patent Laid-Open NO. 2000-103088 describes, in addition to an example where the distribution coefficient varies between the data for the first print head and the data for the second print head, an example where an error diffusion matrix used in error diffusion processing as binarization processing or threshold values in the error diffusion matrix varies.

The multivalued data converted as above are transferred to a first binarization processing section 2010 and a second binarization processing section 2011. In the first binarization processing section 2010 and the second binarization processing section 2011, the binarization processing is executed by an error diffusion method using an error diffusion matrix and threshold values, and the binarized image data are stored respectively in a first band memory 2012 and in a second band memory 2013. Thereafter, the first and second print heads eject ink according to the binary data stored in the respective band memories to perform printing.

FIG. 5 is a diagram showing an arrangement of dots on the print medium which are printed according to the aforementioned processing described in Japanese Patent Laid-Open No. 2000-103088. In FIG. 5, a black circle 21 shows a dot printed by the first print head, a white circle 22 shows a dot printed by the second print head, a circle 23 shown in a hatched line shows a dot printed in an overlapped manner by the first print head and the second print head.

Here, a case will be considered where in the same way as the example shown in FIG. 3, a plane of dots printed in the first print head and a plane of dots printed in the second print head are shifted by an amount corresponding to one pixel from each other in any one of a main scan direction or a sub scan direction. In this case, dots printed in an overlapped manner by both the first print head and the second print head are newly increased, but there exist also dots where the dot composed of two dots which are already printed in the overlapped manner is separated. Accordingly, when the determination is made based upon an area having a certain breadth, the coverage of the dots to the white area does not change so much, therefore not inviting a change of the image density. That is, the overlap of the dots is generated in a certain rate while basically eliminating complementarity or exclusiveness of dot formation by different scans or different print heads. Thereby, even if a shift of a print position due to fluctuations in scan speed of the carriage, fluctuations in distance (distance from a sheet) between the print medium and the ejection opening surface, fluctuations in conveying amount of the print medium, and the like is generated, the degree of fluctuations in image density or the density unevenness due to the fluctuations can be reduced to be small.

Further, Japanese Patent Laid-Open No. 2006-231736 describes the print data generation similar to that in Japanese Patent Laid-Open No. 2000-103088. Specifically, in the same way as Japanese Patent Laid-Open No. 2000-103088, the distribution coefficients are made different between the plural scans or between the plural printing element lines at the time of distributing the multi-valued image data to the plural scans or the plural printing element lines. In Japanese Patent Laid-Open No. 2006-231736, the distribution coefficient varies in accordance with pixel positions. For example, the distribution coefficients of two print heads vary in a linear way, in a periodical way, in a sinusoidal wave way, and in a combined wave way of a high frequency and a low frequency to the pixel position in a main scan direction, thereby restricting banding or color unevenness in the multi-pass printing.

However, in the print data generation method described in Japanese Patent Laid-Open No. 2000-103088 or Japanese Patent Laid-Open No. 2006-231736, since it is, as shown in an example in FIG. 4, necessary to perform quantization or gradation lowering process (binarization in an example in FIG. 4) for each of plurality of divided image data, there exists a problem that the processing load increases. More specifically, the quantization processing is executed using an error diffusion process or a dither process, but this processing itself has the processing circuit a processing load of which is relatively high, and therefore, in a case of executing quantization processing to each of the plural divided images, the processing load is further increased.

As a recent printing apparatus, there is provided a printing apparatus which has properties of high-quality and multi-color and further, a relatively wide printing width of 60 inches, for example, and further, high speeding of the print speed is in progress. For meeting demands for the high quality, the multi-color and the printing to a large scale of sheet, however, there occurs the problem that the image processing is complicated and a circuit scale or a memory capacity increases in proportion to the number of colors or print width and also the cost increases. In addition, high speed of the printing speed increases a load of the image processing and also increases costs. For example, in a case of storing the result of the image processing in a memory, transfer in a wide band is demanded due to many frequencies of data memory access and the circuit scale is increased for realizing the transfer in a wide band. Under these circumstances, performing the quantization to each divided image further causes an increase in the processing load. Therefore, it is preferable to reduce the load relating to the quantization to be as small as possible.

SUMMARY OF THE INVENTION

An object of the present invention is to provide an image processing apparatus, a printing apparatus, and an image processing method which enables generation of print data with reducing a processing load as much as possible and capable of enhancing robustness.

In a first aspect of the present invention, there is provided an image processing apparatus that, for dividing each of a plurality of images which are distinguished from each other by channel information that identifies an image into a plurality of divided images to perform printing, generates print data for each of the plurality of divided images, the apparatus comprising: first processing means for dividing multi-valued data of the image into multi-valued data of the plurality of divided images and making the multi-valued data of each of the plurality of divided images subjected to gradation lowering processing to be print data of a lower gradation value; second processing means for making the multi-valued data of the image subjected to gradation lowering processing to be print data of a lower gradation value and dividing the print data of the lower gradation value into a plurality of print data; and selecting means for, based on the channel information, selecting processing of the multi-valued data of the image for the channel information to be performed by the first processing means or to be performed by the second processing means.

In a second aspect of the present invention, there is provided a printing apparatus that uses a print head to perform printing onto a print medium based on print data for each of a plurality of divided images, in order to divide each of a plurality of images which are distinguished from each other by channel information that identifies an image into the plurality of divided images to perform printing, the apparatus comprising: first processing means for dividing multi-valued data of the image into multi-valued data of the plurality of divided images and making the multi-valued data of each of the plurality of divided images subjected to gradation lowering processing to be print data of a lower gradation value; second processing means for making the multi-valued data of the image subjected to gradation lowering processing to be print data of a lower gradation value and dividing the print data of the lower gradation value into a plurality of print data; and selecting means for, based on the channel information, selecting processing of the multi-valued data of the image for the channel information to be performed by the first processing means or to be performed by the second processing means.

In a third aspect of the present invention, there is provided an image processing method that, for dividing each of a plurality of images which are distinguished from each other by channel information that identifies an image into a plurality of divided images to perform printing, generates print data for each of the plurality of divided images, the method comprising: a first processing step of dividing multi-valued data of the image into multi-valued data of the plurality of divided images and making the multi-valued data of each of the plurality of divided images subjected to gradation lowering processing to be print data of a lower gradation value; a second processing step of making the multi-valued data of the image subjected to gradation lowering processing to be print data of a lower gradation value and dividing the print data of the lower gradation value into a plurality of print data; and a selecting step of, based on the channel information, selecting processing of the multi-valued data of the image for the channel information to be performed by the first processing step or to be performed by the second processing step.

According to the above configuration, division and gradation lowering of an image are carried out not only by a first processing effective in robustness but also by a second processing, in accordance with channel information specifying the image. Thereby, an increase of the processing load by executing the first processing is eliminated as much as possible, to make print data, which is capable of appropriately enhancing robustness in accordance with the image, generated.

Further features of the present invention will become apparent from the following description of exemplary embodiments (with reference to the attached drawings).

BRIEF DESCRIPTION OF THE DRAWINGS

FIGS. 14A and 14B are diagrams each showing a filter calculation, wherein 14A shows coefficients in the filter calculation and 14B shows the calculation result.

DESCRIPTION OF THE EMBODIMENTS

Hereinafter, embodiments of the present invention will be in detail explained with reference to the drawings. It should be noted that the embodiments explained hereinafter relate to an inkjet printing apparatus. However, the present invention can achieve the effect even in an apparatus other than the inkjet printing apparatus as long as the apparatus forms an image in a dot alignment system using a plurality of printing elements.

First Embodiment

Figure 6:
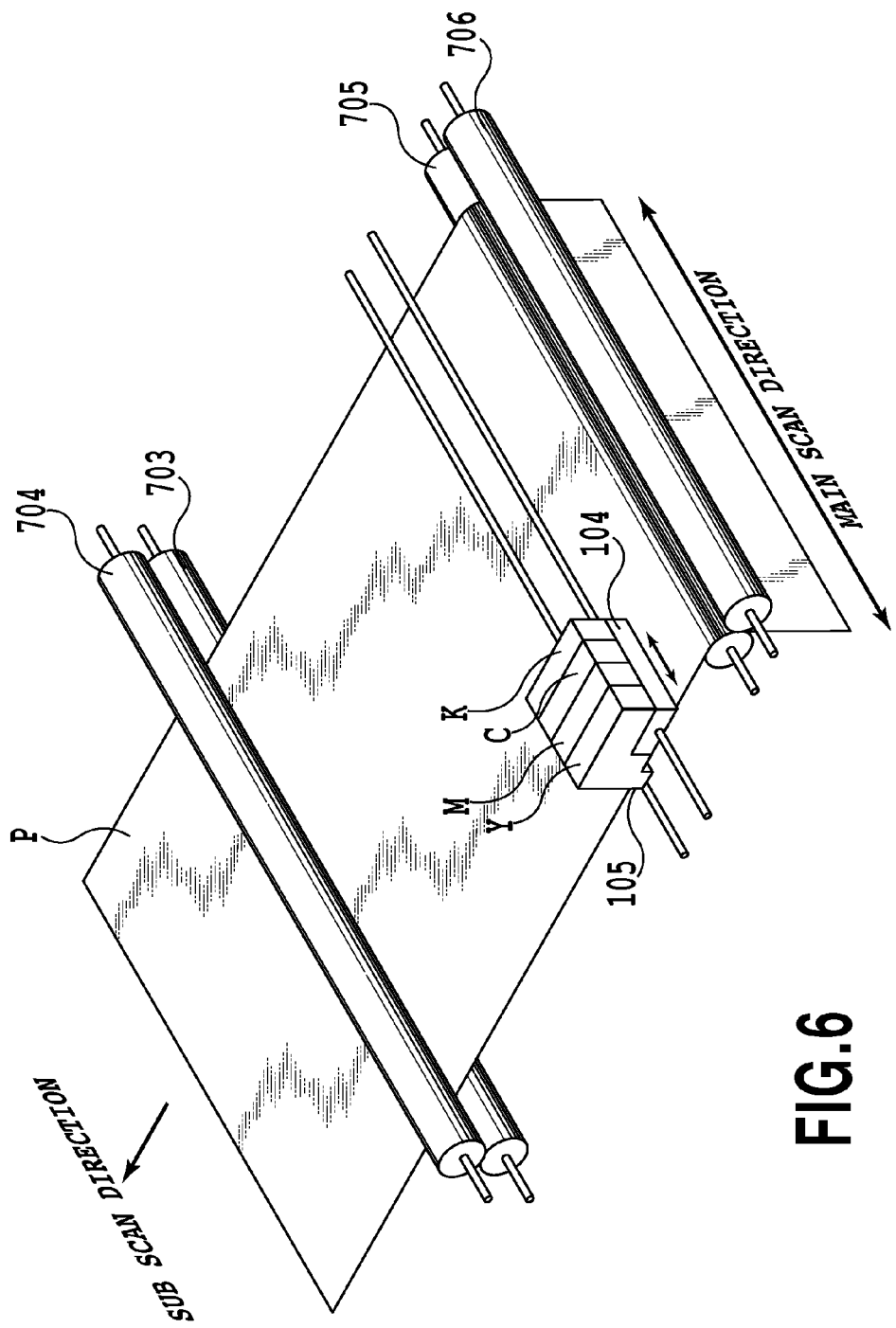
FIG. 6 is a perspective view explaining a schematic construction of a serial type inkjet printing apparatus used in a first embodiment of the present invention.

FIG. 6 is a perspective view explaining a schematic structure of a serial type inkjet printing apparatus used in a first embodiment of the present invention. A print head 105 is mounted on a carriage 104 that moves at a constant speed in a main scan direction and ejects ink according to print data in a frequency corresponding to the constant speed. When one time of scan is completed, a conveying roller 704 and an auxiliary roller 703 rotate and a print medium P held between these rollers and between a feeding roller 705 and an auxiliary roller 706 is conveyed in a sub scan direction by an amount corresponding to a print width by the print head 105. This scan and the conveying operation are intermittently repeated to print an image on the print medium P step by step.

The print head 105 includes print heads of black (K), cyan (C), magenta (M) and yellow (Y) which are located in a main scan direction shown in the figure and plurality of ejection openings are arranged in a sub scan direction in the print heads of the respective colors.

Figure 7:
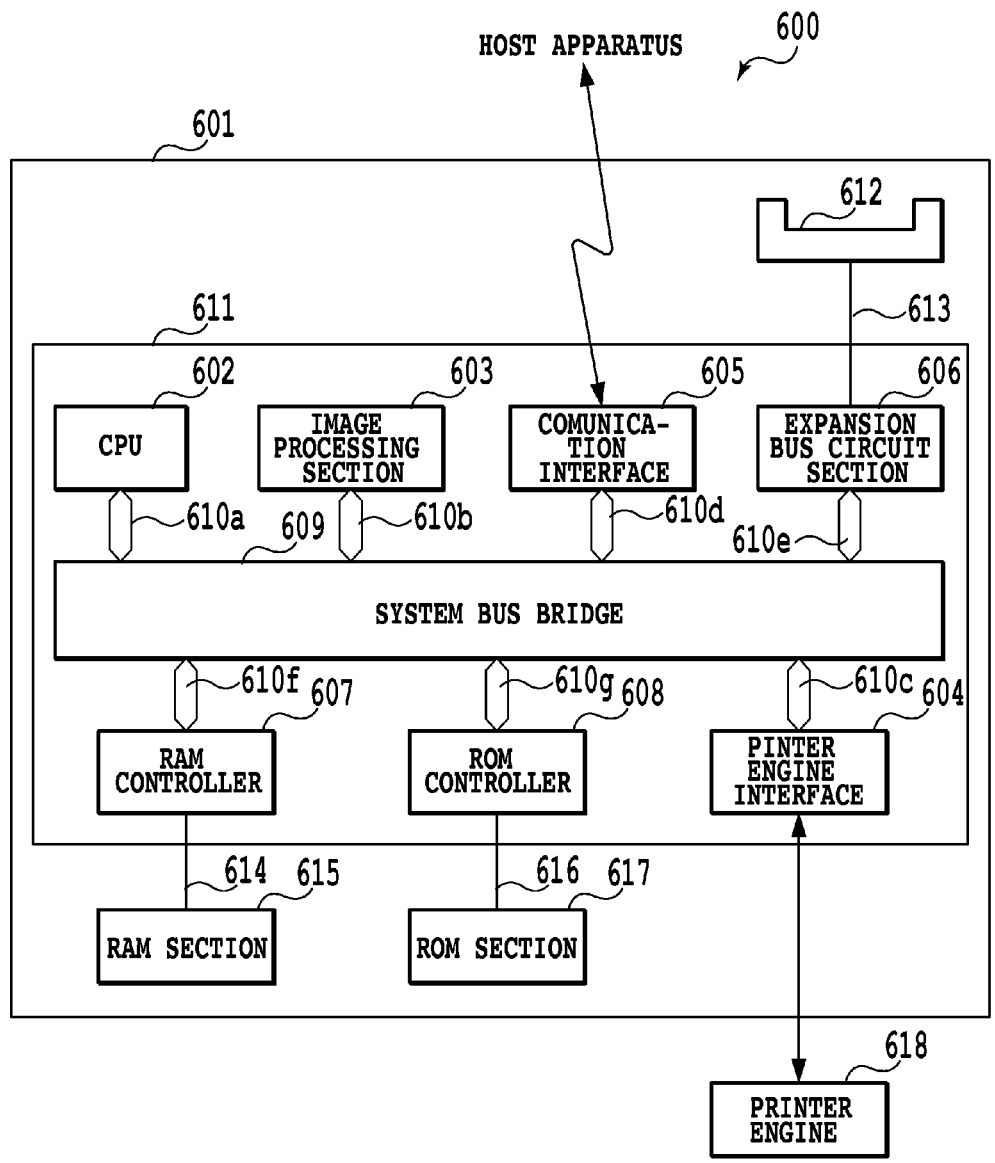
FIG. 7 is a block diagram showing the control construction in the inkjet printing apparatus shown in FIG. 6.

FIG. 7 is a block diagram showing the control configuration in the aforementioned inkjet printing apparatus. As shown in FIG. 7, a printer 600 is generally configured of a controller 601 and a printer engine 618. The controller 601 receives a print instruction and image data for printing from a host computer such as a personal computer and converts the received image data into binary data of a printable form at the printer engine 618 and outputs the binary data. The controller 601 is provided with a CPU 602, an image processing section 603, a printer engine interface section 604, a communication interface section 605, an expansion bus circuit section 606, a RAM controller 607, and a ROM controller 608. Further, each of these sections is connected through respective bus lines 610a to 610g to a system bus bridge 609. In the present embodiment, these sections are realized as an image formation controller ASIC (Application Specified Integrated Circuit) 611 enclosed by one package as a system LSI. The controller 601 is constructed to include an expansion slot 612 to which a function expansion unit is mounted, a RAM section 615 and a ROM section 617, and besides, a control section (not shown), a display section, a power circuit section and the like.

The CPU 602 controls the entire controller 601, and reads out and executes programs such as the control procedure stored in the ROM section 617 or the RAM section 615. For example, controlling the image processing section 603 is performed for converting image data received from the host apparatus into print data as binary data. In addition, the CPU 602 performs control of the communication interface section 605, interpretation of communication protocol, control of the printer engine interface section 604 for transferring print data generated by the image processing section 603 to the printer engine 618, and the like.

The image processing section 603 is configured to convert image data received from the host apparatus into print data printable in the printer engine 618 and the detailed configuration for the conversion will be explained in FIG. 8 and the subsequent figures. The printer engine interface section 604 is a section of transmitting and receiving data between the controller 601 and the printer engine 618. Specifically, the printer engine interface section 604 has a DMAC (direct memory access controller). In consequence, binary data generated by the image processing section 603 and stored in the RAM section 615 are read out through the RAM controller 607 sequentially and can be transferred to the printer engine 618.

The communication interface section 605 transmits and receives data to and from a host apparatus such as a personal computer or a work station and stores image data received from the host apparatus in the RAM section 615 through the RAM controller 607. A communication system of the communication interface section 605 may adopt any system of high-speed serial communication such as USE and IEEE 1394, parallel communication such as IEEE 1284 or network communication such as 100BASE-TX. In addition, a combination of these communication systems may be adopted. Further, not only wired communication systems, but also wireless communication systems may be adopted.

The expansion bus circuit section 606 controls a function expansion unit mounted to an expansion slot 612. For example, the expansion bus circuit section 606 performs control of transmitting data through an expansion bus 613 to the function expansion unit and control of receiving data outputted from the function expansion unit. A communication unit for providing a communication function to the host apparatus, such as USB, IEEE 1394, IEEE 1284 or network communication, a hard disc drive unit for providing a large capacity memory function or the like can be mounted to the expansion slot 612.

It should be noted that the image processing section 603, the communication interface section 605, and the expansion bus circuit section 606 each have DMAC in the same way as the printer engine interface section 604 and can issue a memory access demand.

The RAM controller 607 controls the RAM section 615 connected through the RAM bus 614 to the image formation controller ASIC 611. The RAM controller 607 relays data written in and read out between the CPU 602, each section having the DMAC, and the RAM section 615. The RAM controller 607 generates control signals necessary in accordance with a reading-out demand or a writing-in demand from the CPU 602 and the each section to realize the writing-in to the RAM section 615 or the reading-out from the RAM section 615.

The ROM controller 608 controls the ROM section 617 connected through the ROM bus 616 to the image formation controller ASIC 611. The ROM controller 608 generates a control signal necessary in accordance with a reading-out demand from the CPU 602 to read out the control procedure or the data in advance stored in the ROM section 617 and transmits back the read content through the system bus bridge 609 to the CPU 602. In addition, in a case where the ROM section 617 is constructed of an electrically rewritable device such as a flash memory, the ROM controller 608 generates a necessary control signal to rewrite the content in the ROM section 617.

The system bus bridge 609 is provided with a function connecting the respective sections constituting the image formation controller ASIC 611 and besides, adjusts the bus right in a case where access demands are issued from a plurality of sections simultaneously. In a case where the CPU 602 and each section having the DMAC substantially simultaneously issue access demands through the RAM controller 607 to the RAM section 615, the system bus bridge 609 can appropriately adjust the access demands according to a priority in advance assigned.

The RAM section 615 is constructed of synchronous DRAM or the like and stores control procedure programs executed by the CPU 602 or temporarily stores image formation data generated at the image processing section 603 and provides a function such as a work memory of the CPU 602. In addition, the RAM section 615 performs temporary buffering of image data which the communication interface section 605 receives from the host apparatus and temporarily stores data from the function expansion unit connected through the expansion bus 613.

The ROM section 617 is constructed of a flash memory or the like and stores parameters necessary for the control procedure and the printer control executed by the CPU 602. The flash memory is an electrically rewritable and nonvolatile device and can rewrite the control procedure and the parameters according to determined sequence.

In addition to the above, each circuit section is provided with a resister setting an operation mode or the like and the CPU 602 can set an operation mode or the like of each circuit section through a resister access bus (not shown).

The printer engine 618 is, as in the case of the major construction shown in FIG. 6, a print mechanism for printing an image on a print medium based upon binary data transmitted from the controller 601.

Figure 8:
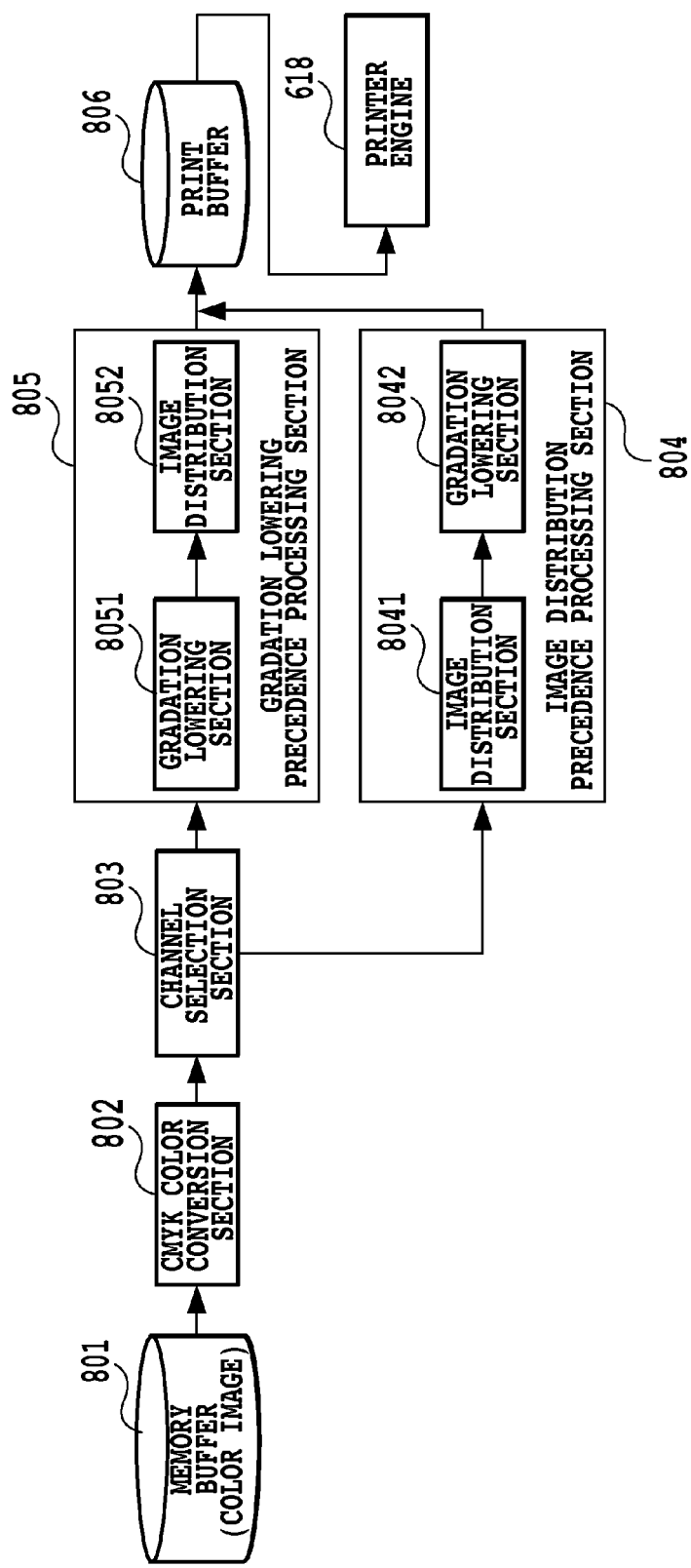
FIG. 8 is a block diagram showing mainly a detailed construction in an image processing section 603 shown in FIG. 7.

FIG. 8 is a block diagram showing mainly a detailed configuration of the image processing section 603 shown in FIG. 7.

When the image processing section receives image data to be printed from the host apparatus, the received image data are stored in the memory buffer 801. The image data are formed of multi-valued data of red (R), green (G), and blue (B) which are expressed by 256 gradations of 8 bits per one pixel, for example. The data stored in the memory buffer 801 are transferred to a CMYK color conversion section 802 one pixel by one pixel in a predetermined timing to be converted into image data having a density value of multi value (256 gradations of 8 bits) corresponding to colors of ink used in the printing apparatus. This brings generation of print data used in each of two times of scans in a multi-pass printing which completes a print on the same area with two times of scans in the inkjet printing apparatus shown in FIG. 6.

The channel selection section 803 selects whether the subsequent processing to the image data is executed by image distribution precedence processing (first processing) or by gradation lowering precedence processing (second processing), in accordance with channel information of the image data. That is, the channel selection section 803 sends the image data to the image distribution precedence processing section 809 or the gradation lowering precedence processing section 805 in accordance with the selection result of the channel selection section.

Here, the "channel" means information for identifying image data and the information is distinguished by a color of ink or an ink ejection amount used in a printing in the present embodiment. For example, in a case where the colors of inks used in printing are composed of black (K), cyan (C), magenta (M) and yellow (Y) and the image data is defined for each ink color, four channels exist. In addition, in a case where the ink color is the same, but the ink ejection amount is different, the channel can be distinguished by the ejection amount. For example, in a case where the ink ejection amount is composed of three kinds of 1 pl, 1.5 pl, and 2 pl and the image data is defined for each ejection amount, three channels are defined. When the distinction by the ink color is combined to the distinction of the ejection amount, the channel number is total of twelve as four colors×three kinds. In the present embodiment, an example distinguished by the ink color will be explained.

Figure 9:
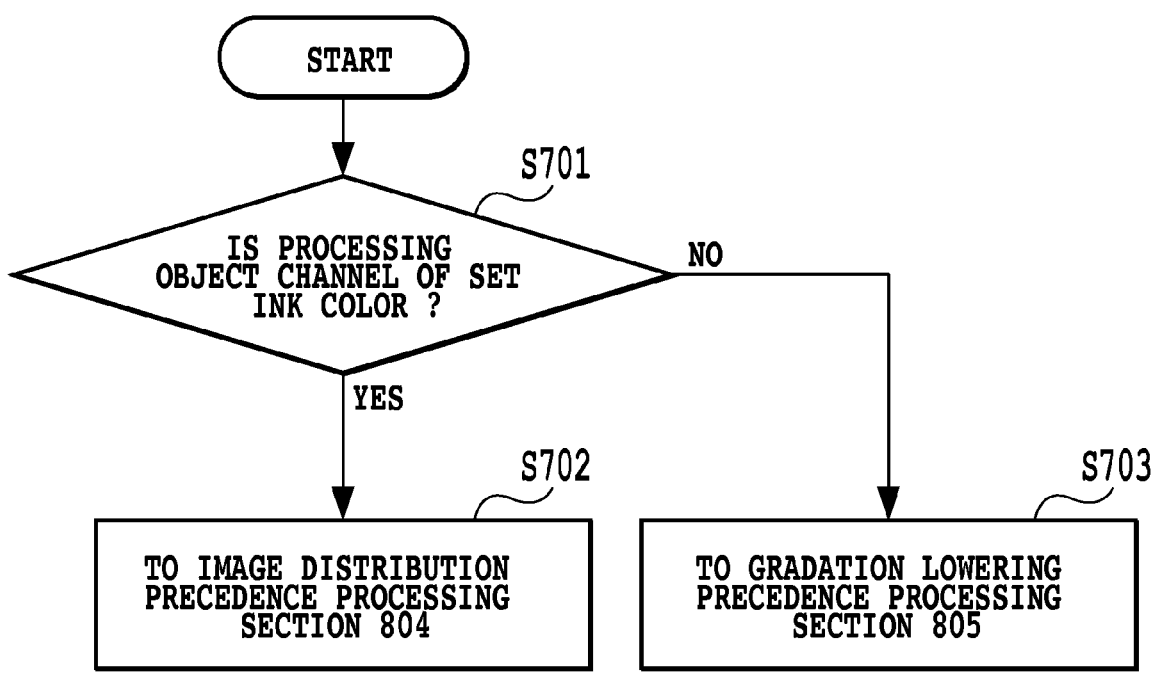
FIG. 9 is a flow chart showing selection processing by a channel selection section 803 shown in FIG. 8.

FIG. 9 is a flow chart showing the selection processing by the channel selection section 803. The channel selection section 803 first determines at step S 701 whether or not a channel of the image data for which the selection is executed is a channel of the ink color that is previously set. When it is determined that the channel of the image data for the selection is the channel of the set ink color, the process goes to step S702, wherein the image data are transferred to the image distribution precedence processing section 804. On the other hand, when it is determined that the channel of the image data for the selection is not the channel of the set ink color, the process goes to step S703, wherein the image data are transferred to the gradation lowering precedence processing section 805.

Here, the setting of the ink color for the channel is as follows. Although it depends on matters composing the ink, for example, in printing with the color of ink having high density or low brightness, if printing positions of dots are shifted, a change in density of an image to be printed easily becomes large. Therefore, in the present embodiment, regarding channels of C, M and K inks showing relatively high density or low brightness among ink of C, M, K, and Y, the image distribution precedence processing section 804 of higher robustness is selected.

On the other hand, regarding color of ink showing high brightness or low density, the density change is not so much large even if the printing position of the dot is shifted. Therefore, in regard to the channel of such a color of ink, the gradation lowering precedence processing section 805 is selected. In the present embodiment, regarding Y channel showing relatively high brightness among ink of C, M, K, and Y, the gradation lowering precedence processing section 805 is selected.

Referring again to FIG. 8, multi-valued image data transferred to the gradation lowering precedence processing section 805 is subjected to gradation lowering (quantizing) processing by a gradation lowering section 8051 (second gradation lowering means). In the present embodiment, the multi-valued image data are converted into binary data. That is, data of 256 gradation values of 8 bits are subjected to the gradation lowering processing to be data of 2 gradation values of 1 bit. The binary print data are distributed or divided to image data of two planes corresponding to two scans of the print head for completing the printing, by the image distribution section 8052 (second distribution means).

Figure 2:
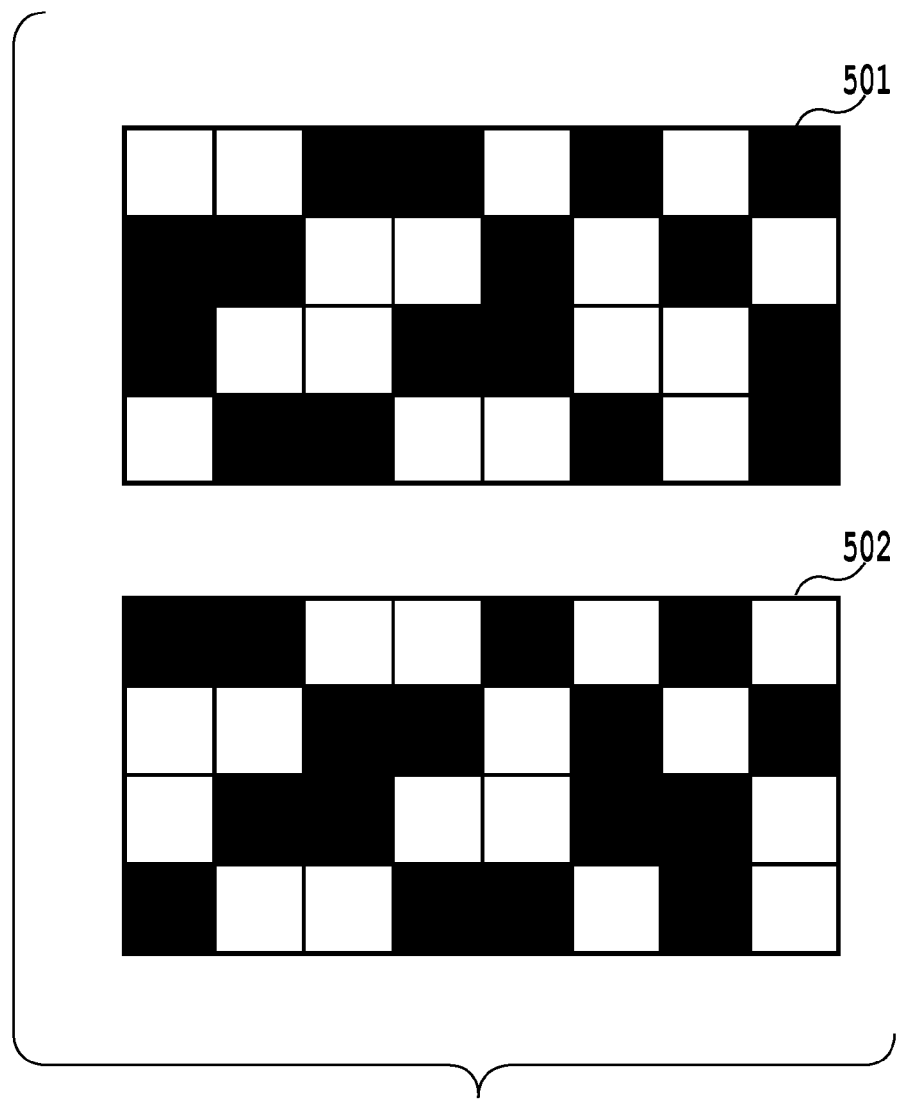
FIG. 2 is a diagram showing an example of a mask pattern used in a multi-pass print for completing a print by twice scans in a serial print system.
Figure 3:
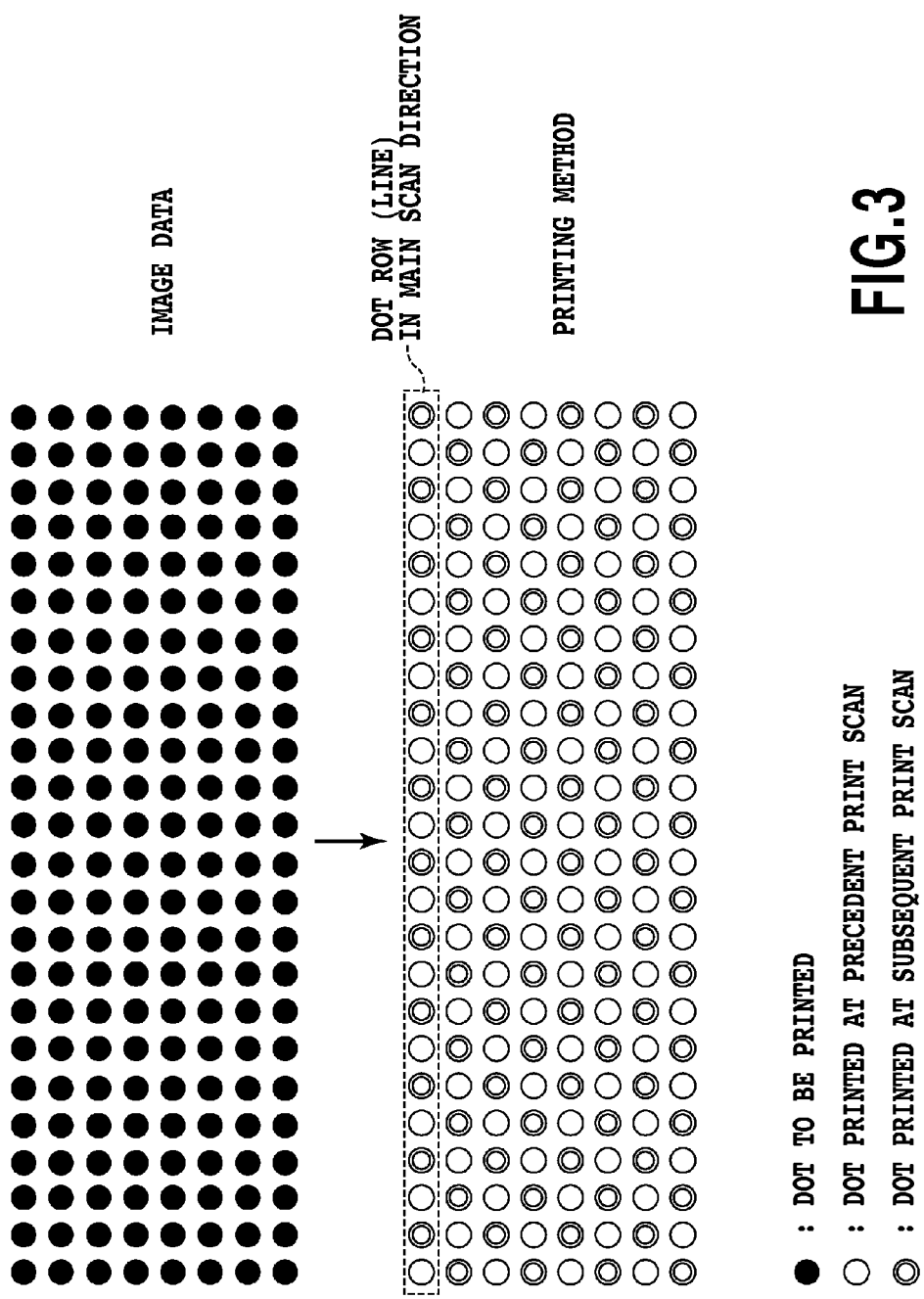
FIG. 3 is diagrams showing an arrangement of print pixels in binary image data according to the conventional example and the result obtained by distributing the print pixels to twice scans according to the method described in Japanese Patent Laid-Open No. H06-191041 (1994)
Figure 4:
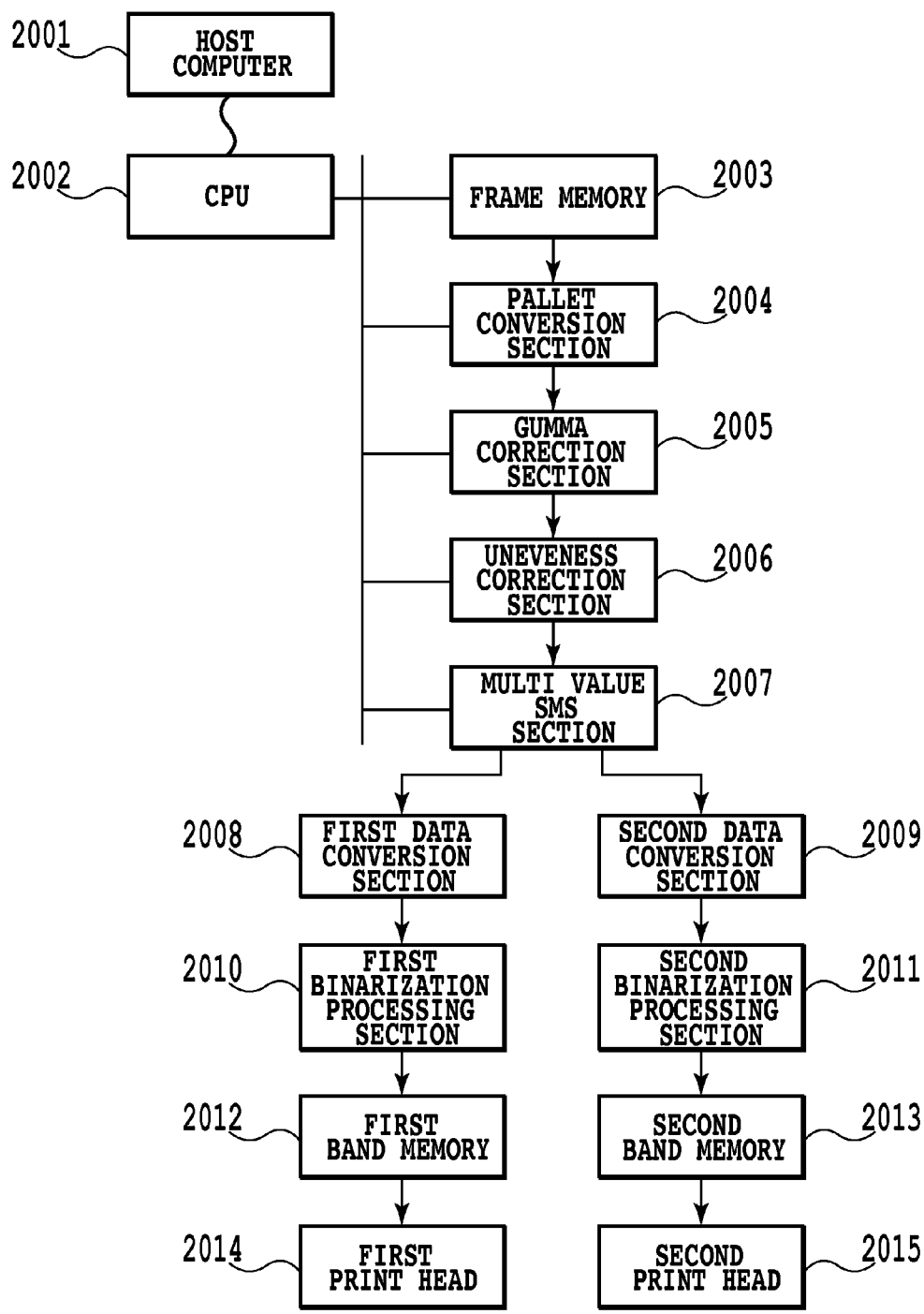
FIG. 4 is a block diagram showing a control construction example for realizing data distribution described in Japanese Patent Laid-Open No. 2000-103088.
Figure 5:
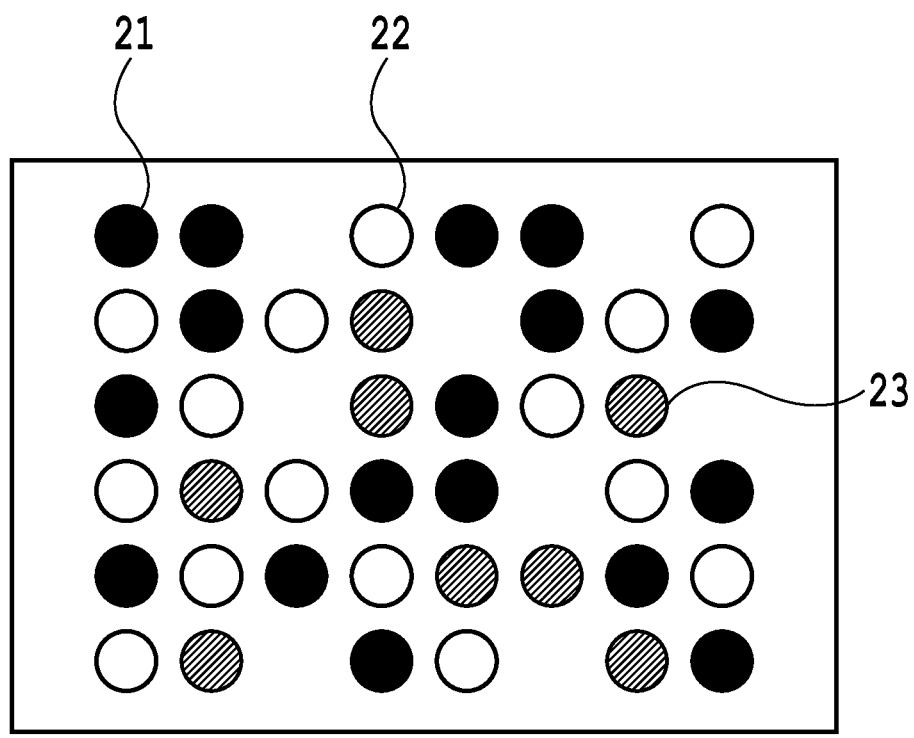
FIG. 5 is a diagram showing an arrangement of dots printed on a print medium according to the aforementioned processing described in Japanese Patent Laid-Open No. 2000-103088.

It should be noted that the aforementioned gradation lowering processing may use a quantization method such as an error diffusion process or a dither process generally known. In addition, the image distribution method of the image distribution section 8052 is also not limited in particular. For example, the mask pattern as shown in FIG. 2 may be used or the random mask pattern described in Japanese Patent Laid-Open No. H07-052390 (1995) may be used. Further, random series or random regular may be used. Further, as described in Japanese Patent Laid-Open No. H06-191041 (1994), it may be determined for each pixel to which plane the print pixel should be distributed while confirming the plane for printing the print pixels continuous in a main scan direction or in a sub scan direction.

On the other hand, the multi-valued image data transferred to the image distribution precedence processing section 804 are first divided into image data of two planes (first divided image and second divided image) corresponding to two scans of the print head for completing the printing, by the image distribution section 8041 (first distribution means). It should be noted that an event of dividing multi-valued image data into plural planes is also called an event of distributing the multi-valued image data to the plural planes. This distribution can be performed by a distribution method described in Japanese Patent Laid-Open No. 2000-103088 or Japanese Patent Laid-Open No 2006-231736 described before, for example, by a method of making the distribution coefficient different between planes for giving certain robustness to an image to be printed. The multi-valued image data distributed as described above are subject to gradation lowering processing in each plane by the gradation lowering section 8042 (first gradation lowering means). At this time, the method of the gradation lowering in use may adopt an error diffusion process or a dither process generally known. It should be noted that the multi-valued image data are equally distributed (to equal distribution coefficient) at the above distribution processing and at the process of the gradation lowering, as described in Japanese Patent Laid-Open No. 2000-103088, the threshold value in the error diffusion or the content of the error diffusion itself may be made different between the planes to give the robustness to the print data.

The print data of the two planes subjected to gradation lowering process by any of the image distribution precedence processing section 804 or the gradation lowering precedence processing section 805 are once stored in the print buffer 806 corresponding to each plane. Thereafter, ink is ejected from the print head in the printer engine 618 based on the print data stored in each print buffer 806 for performing the printing.

As described above, not to select the image distribution precedence processing section 804, for which the robustness is considered, for all the channels can restrict an increase in the processing load due to executing the gradation lowering processing after the distribution processing to each of the plural divided images. More specifically, since the gradation lowering processing is executed to one image data for each divided image in the image distribution precedence processing, the processing performance or the processing load needed in the image processing system is increased. On the other hand, since the gradation lowering processing of one time may be executed to one image data in the gradation lowering precedence processing, the processing performance or the processing load needed in the image processing system is lower in the gradation lowering precedence processing. That is, the image distribution precedence processing is executed only to data of the color of ink identified as in the case of the present embodiment, making it possible to reduce the performance or the load required for the image processing system. According to the image processing method of the present embodiment thus, the printing of a uniform image excellent in robustness can be performed while restricting the load in the image processing system.

Figure 10:
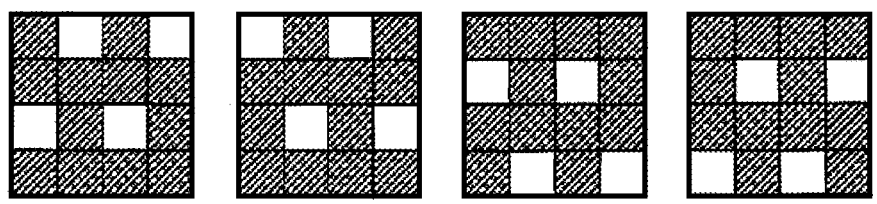
FIG. 10 is a diagram showing an example of four patterns complementary with each other.

It should be noted that the example explained above relates to the multi-pass print of two-pass, but the present invention can be applied also to the print by more multi-pass numbers. For example, in a case of a multi-pass printing of four-pass, in the image distribution section 8041 in the image distribution precedence processing section 804, the multi-valued image (for example, 256 values) is distributed to four planes by making the distribution coefficient different with each other. In addition, in the image distribution section 8052 in the gradation lowering precedence processing section 805, the image data which has been subjected to the gradation lowering processing by using four mask patterns having a complementary relation with each other as shown in FIG. 10 can be distributed to four planes, for example.

Second Embodiment

A second embodiment of the present invention relates to the processing of image data of channels distinguished based on an ink ejection amount and executes the processing similar to the process shown in the image processing shown in FIG. 8 in the printing apparatus shown in FIG. 6 of the above first embodiment.

Figure 11:
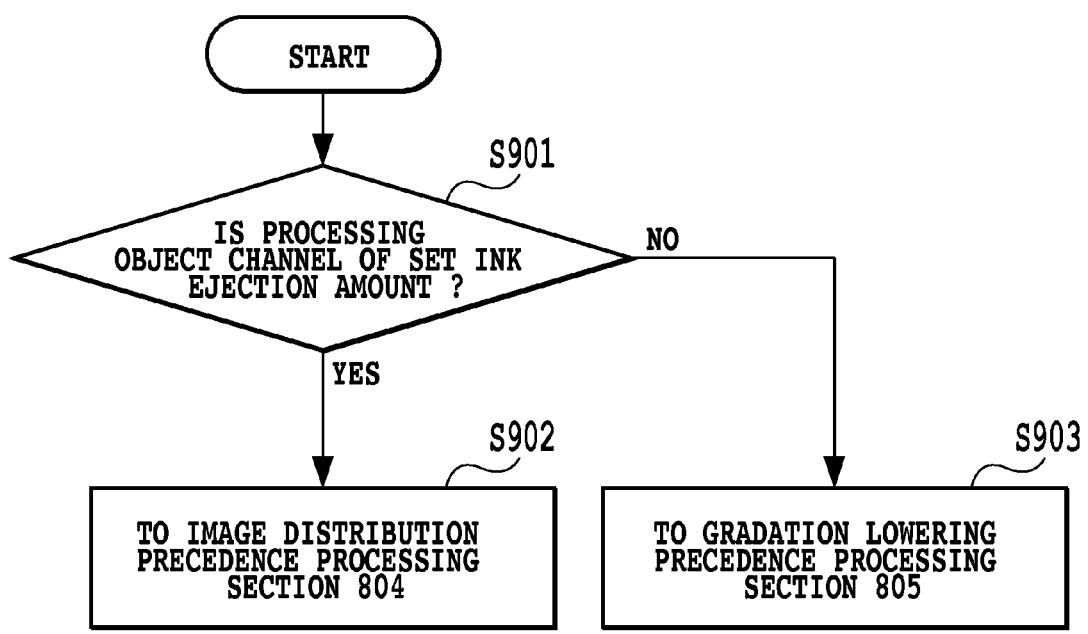
FIG. 11 is a flow chart showing the processing executed by a channel selection section 803 according to a second embodiment of the present invention.

FIG. 11 is a flow chart showing the processing executed by the channel selection section 803 in the present embodiment. As shown in this figure, the channel selection section 803 determines at step S901 whether or not a channel of the image data for which the selection is executed is a channel of the ink ejection amount that is previously set. In the present embodiment, three kinds of ink ejection amounts of 1 pl, 1.5 pl and 2 pl are possible. Specially in a case of performing a printing operation using respective print heads (or respective ejection opening lines) of an ejection amount of 1 pl, 1.5 pl or 2 pl, the processing in the image processing section 603 generates the print data for each print head. Then, in the print data generation, the channel selection section 803 makes determination using the channel of the ink ejection amount of 2 pl as a criterion among the three kinds of the ejection amounts.

When it is determined at step S901 that the channel of the image data is the channel of the set ink ejection amount of 2 pl, the process goes to step S902, wherein the image data for selection are transferred to the image distribution precedence processing section 804. On the other hand, when it is determined at step S901 that the channel of the image data is not the channel of the set ink ejection amount, that is, when it is determined that the channel of the image data is a channel of the ejection amount of 1 pl or 1.5 pl, the process goes to step S903, wherein the image data for selection are transferred to the gradation lowering precedence processing section 805.

As explained above, according to the present embodiment, since in regard to the channel in which the ink ejection amount is relatively large, when the position of the dot to be printed is shifted, the change of the print density easily becomes large due to the shift. Therefore, the image distribution precedence processing excellent in robustness is selected. On the other hand, in regard to the channel in which the ink ejection amount is relatively small and in which even if the shift of the printing position is caused, the change of the density becomes not so much large, and therefore the gradation lowering precedence processing is selected. The image distribution precedence processing is thus executed only to the image data of the set ink ejection amount, thereby making it possible to output a uniform image excellent in robustness while reducing the load in the image processing system.

Figure 12:
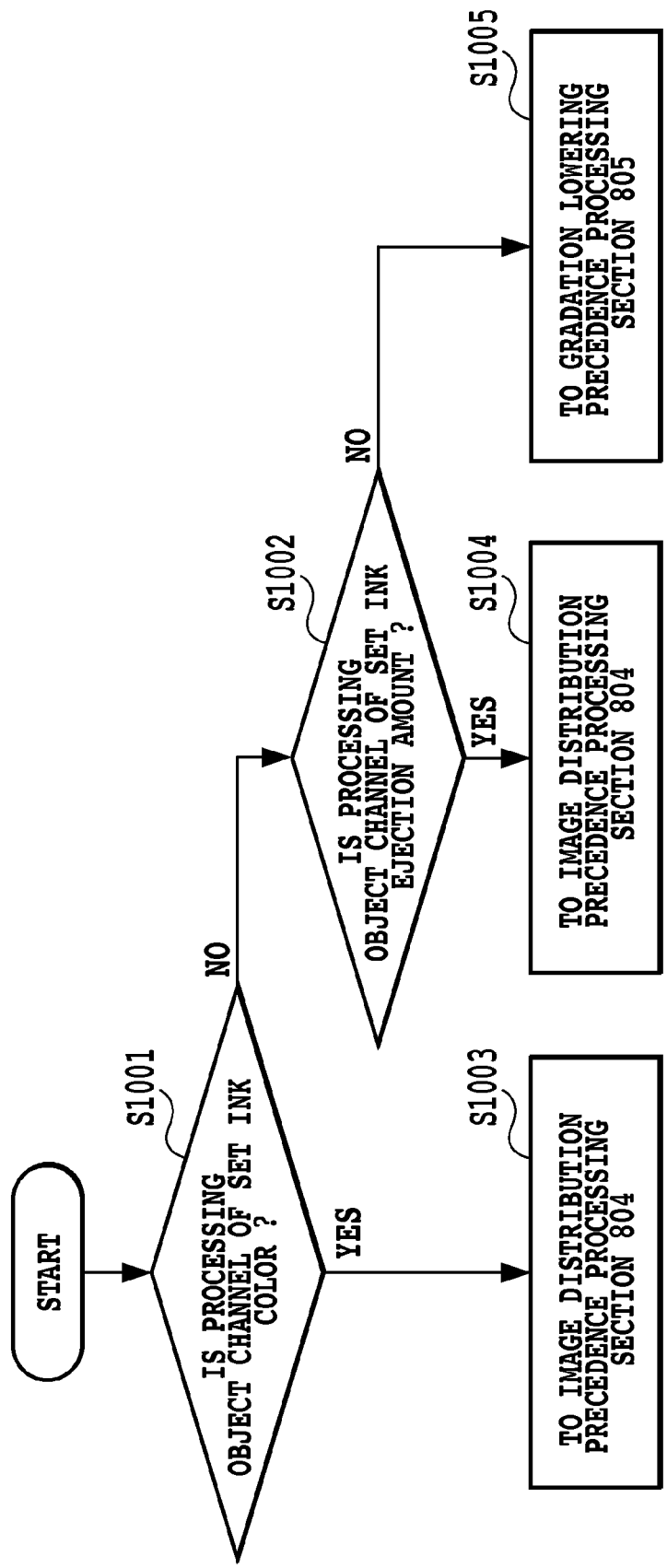
FIG. 12 is a flow chart showing the processing executed by a channel selection section according to a modification in the second embodiment of the present invention.

It should be noted that in the above second embodiment, the ink ejection amount to be set is one ejection amount of 2 pl, but plural ejection amounts may be set, and by defining a channel of the ink ejection amount set in accordance with a combination of the ink color, the above effect can be further increased. For example, as shown in FIG. 12, any of the image distribution precedence processing and the gradation lowering precedence processing may be selected for the plurality of channels of processing image data depending on a combination of the ink color and the ink ejection amount. In an example shown in FIG. 12, the color of ink is determined (S1001). When it is determined that the dolor of ink is the set color of ink (YES), the process moves to step S1003. On the other hand, when step S1001 determines NO and the result of determination of the ejection amount (S1002) is a set ejection amount (YES), the process moves to step S1009. For example, processes for image data of C and M inks moves to step S1003. However, a process for image data of Y ink is controlled to move to step S1004 in the case that the ejection amount is 2 pl. Processes for image data of Y ink which corresponds to the ejection amounts of 1 pl and 1.5 pl are controlled to move to step S1005. As described above, the determination of color of ink and the determination of ejection amount are combined to select the process properly. It should be noted that processes to be executed for the combination of a color of ink and an ejection amount may be previously selected to generate a table and the process to be executed may be determined based on the table of the color of ink and the ejection amount.

Third Embodiment

A third embodiment of the present invention relates to a printing apparatus using a full line type print head in which two print heads perform the print operation similar to the multi-pass printing.

Figure 1:
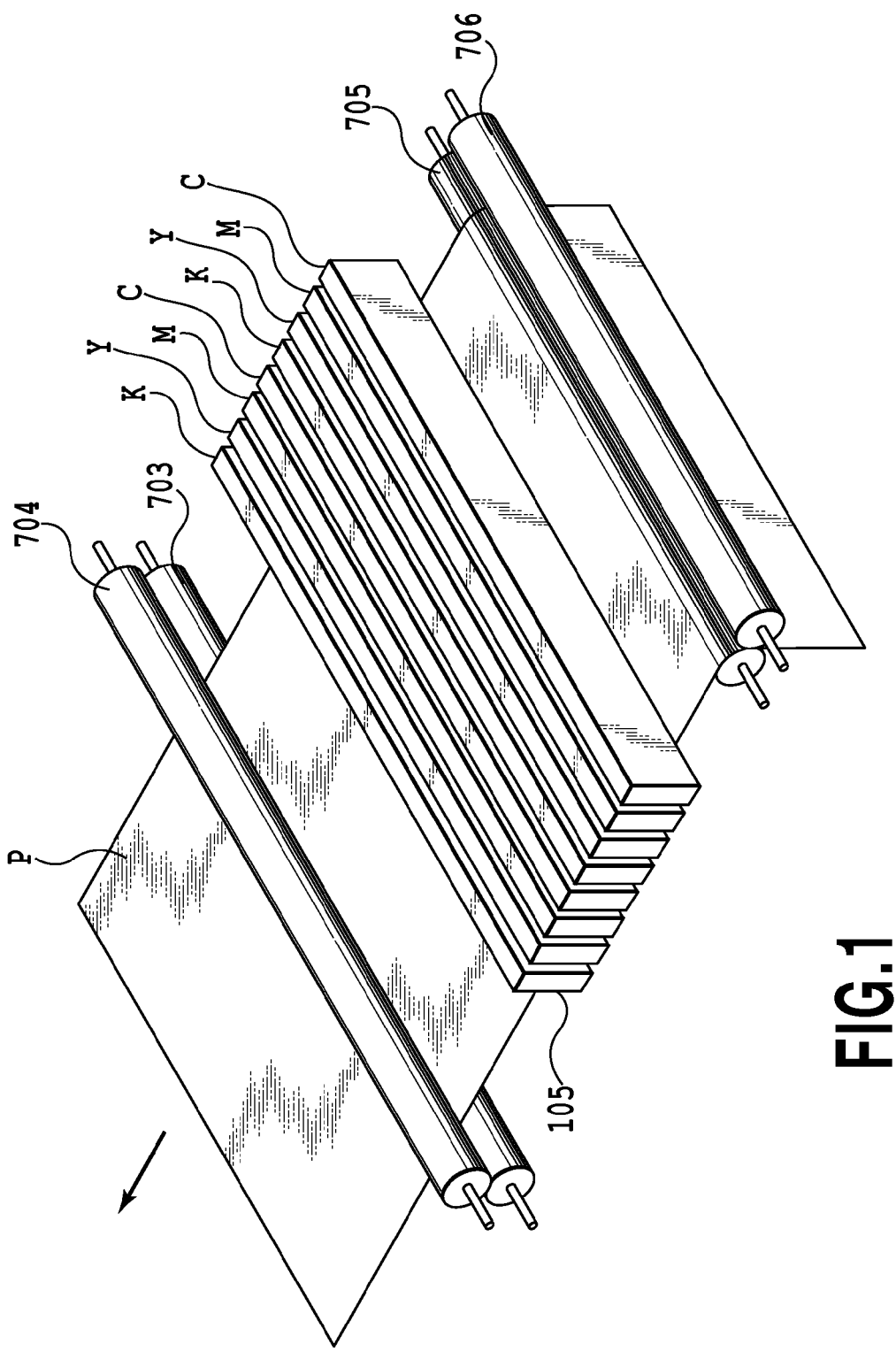
FIG. 1 is a perspective view showing the construction of an inkjet printing apparatus using a full line type print head according to a third embodiment of the present invention.

FIG. 1 shows the general construction of a full line type inkjet printing apparatus according to the present embodiment. In FIG. 1, after the print medium P receives a sheet fed by the feeding roller 705 and the auxiliary roller 706, the print medium P is conveyed in the direction of the feeding roller 704 and the auxiliary roller 703 and is conveyed in a sub scan direction at a predetermined speed while being held by the two pairs of the rollers. Ink is ejected onto the print medium to be thus conveyed from respective ejection openings of the print head 105 arranged in a main scan direction, at a certain frequency corresponding to the conveying speed of the print medium. The print head 105 includes the full line type print heads for ejecting ink of cyan (C), magenta (M), yellow (Y) and black (K) which are arranged to form two lines of the print heads for each color at a certain interval in a sub scan direction. Specifically, the image data of each of K, C, M and Y are distributed to two planes (data of the divided images) corresponding to the two print heads of each color, and in a line of pixels connected in a sub-scan direction, dots are formed with ink ejected from ejection openings of the two print heads for each color.

Figure 13:
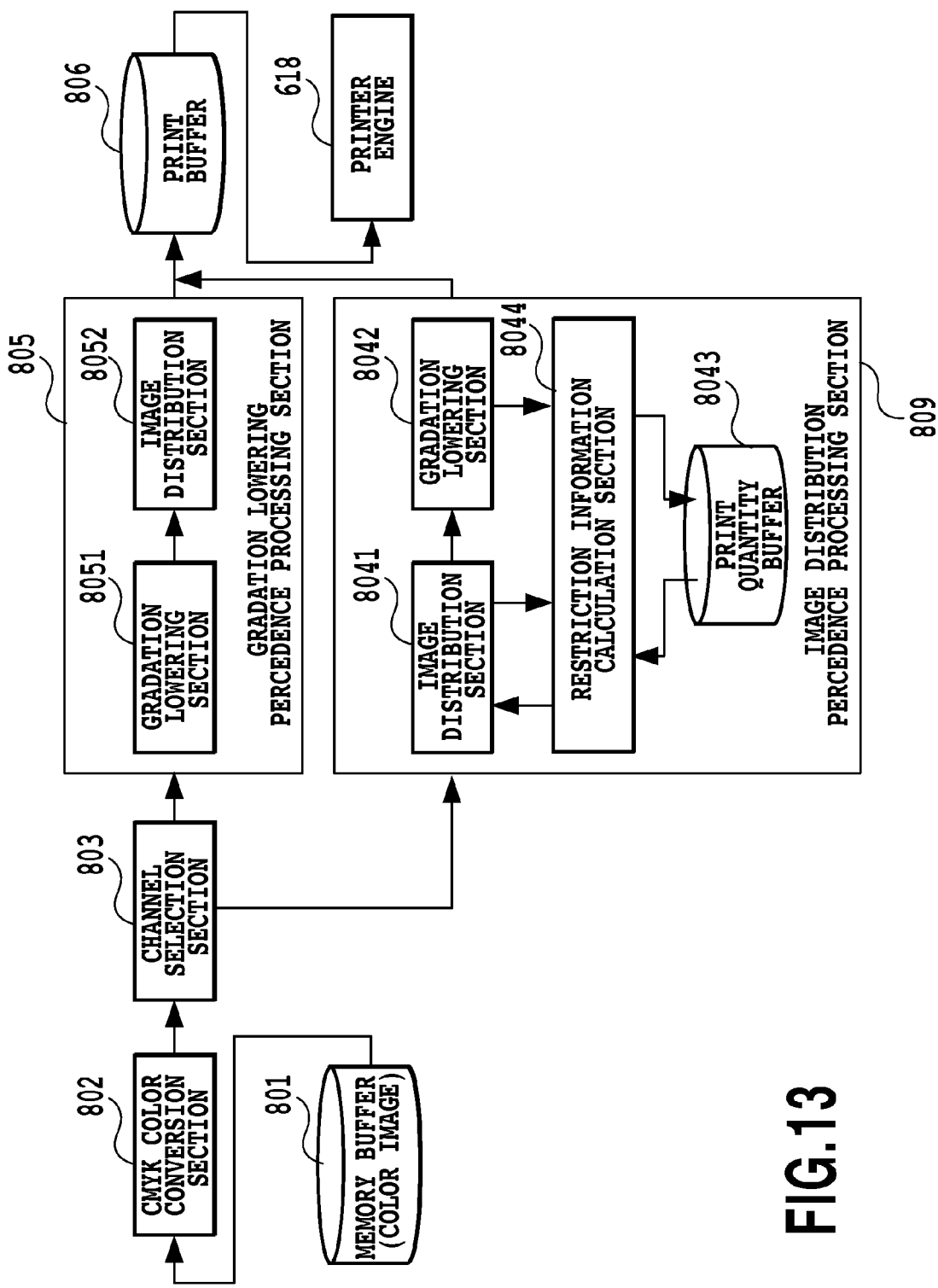
FIG. 13 is a block diagram explaining a function of an image processing section 603 according to a third embodiment of the present invention.

FIG. 13 is a block diagram for explaining a function of the image processing section 603 according to the present embodiment. The configuration other than the image distribution precedence processing section 809 is the same as the aforementioned embodiment. Also in the present embodiment, the channel selection section transfers the image data of each of C, M and K to the image distribution precedence processing section 809 and transfers the image data of Y to the gradation lowering precedence processing section 805. The image distribution precedence processing section 809 of the present embodiment makes the robustness of the image for which printing is completed by two print heads of each color of C, M and K more appropriate. Hereinafter, the image distribution precedence processing section 809 of the present embodiment will be explained.

The multi-valued image data transferred from the channel selection section 803 to the image distribution precedence processing section 809 are distributed to two planes by the image distribution section 8041. In this distribution, a correction value which a restriction information calculation section 8044 generates based on print quantity data stored in the print quantity buffer is, as described in FIG. 14 and the subsequent figures, added to multi valued (256 values) data of the second plane. This causes a certain complementary relation to be brought between quantized data of two planes of each color. More specifically, the image distribution section 8041 corrects the multi-valued data by adding the correction value as described later and thereby, a certain complementary relation can be brought between the binary data obtained by quantizing the corrected multi-valued data and binary data of the other plane. It should be noted that in regard to the first plane, since the result of the gradation lowering relating to the previous plane does not exists therein, the multi-valued data are sent to the gradation lowering section 8042 without the correction processing. In addition, the processing result of the first plane at the gradation lowering section 8042 is sent to the print buffer 806, as well as the print quantity buffer 8043 to be stored therein as the print quantity.

The distribution itself in the image distribution section 8041 is equally made to the two planes in the present embodiment the distribution coefficient is 0.5 in any plane). It should be noted that the distribution coefficient is not limited thereto, but as described in Japanese Patent Laid-Open No. 2000-103088, the distribution coefficient may be made different between the planes or as described in Japanese Patent Laid-Open No. 2006-231736, the distribution coefficient may be made different according to the pixel position.

The gradation lowering section 8042 executes binarization processing by the error diffusion process for each plane of each color. More specifically, the gradation lowering section 8042 of the present embodiment executes the processing of converting the multi-valued image having 256 gradation values of eight bits into binary data of the lower gradation value as 2 gradation values of one bit. It should be noted that the gradation value lowered data obtained by the gradation lowering processing is not limited to the binary data without mentioning. For example, the multi-valued image may be converted into so-called index data of 16 gradation values of four bits. The index data correspond to a dot arrangement pattern of the number of dots corresponding to the gradation value and the arrangement of the dots to be printed is defined by fixing the index data. A method of the gradation lowering is not limited to the error diffusion process, but the other binarization process such as a dither process may be employed. The print data of C, M and K binarized by the gradation lowering section 8042 are sent to the print buffer 806.

The restriction information calculation section 8044 generates and updates the restriction information for the print data of the first plane for each of C, M, K stored in the print quantity buffer 8043. Specifically, the restriction information calculation section 8044 performs a filter calculation (filtering) to the binary data of the first plane of each color obtained from the print quantity buffer.

FIGS. 14A and 14B are diagrams showing a filter calculation, wherein FIG. 14A shows coefficients of the filter calculation and FIG. 14B shows the calculation result. In each of these figures, a pixel shown in a hatched line is an object pixel defined as a processing object by the gradation lowering section 8042 and the restriction information calculation section 8044 distributes the result of the binarization to the peripheral pixels based on a coefficient of each pixel shown in FIG. 14A. Specifically, when the result of the binarization is "1" (dot print), the result obtained by multiplying 256 by the coefficient of each pixel is defined as a value of each pixel. On the other hand, when the binary data is "0" (dot is not printed), the result obtained by multiplying 0 by the coefficient of each pixel is defined as a value of each pixel. As clearly seen from the coefficients shown in FIG. 14A and the distribution result shown in FIG. 14B, in the value of each pixel in the present embodiment, the pixel corresponding to the object pixel is the largest and the next largest value is distributed to pixels positioned at the upward and downward sides and at the right and left sides of the object pixel.

Figure 15:
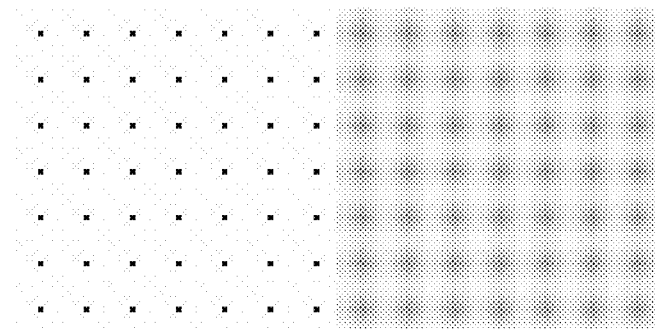
FIG. 15 is diagrams showing the output result (binary data before filtering) of a gradation lowering section 8042 in the third embodiment and the result (data after filtering) after the above filtering processing is executed to this output result.

FIG. 15 is diagrams showing the output result (binary data before filtering) of the gradation lowering section 8042 and the result (data after filtering) after executing the filtering processing to the output result. In an example shown in this figure, a solid image having relatively low density is binarized and as a result the binary data "1" (dot print) exists in each of pixels existing away by a constant interval vertically and horizontally (binary data before filtering). The each pixel of the binary data is made be the object pixel and distributed to the peripheral pixels to obtain an arrangement of multi valued (256 values) data in which a value of the pixel corresponding to the object pixel is maximum. A difference is taken for each pixel between the multi-valued data after filtering obtained as the above and the multi-valued data (data outputted from the image distribution section 8041 to the gradation lowering section 8092) before being subject to gradation lowering processing (binarization) at the gradation lowering section 8042. Thereby, print quantity information of the plane as the processing object at this time is generated. Density is preserved between the multi-valued data (brightness values of 0 to 255 of red (R), green (G), and blue (B)) outputted from the image distribution section 8091 and the multi-valued data (brightness values of 0 to 255 of red (R), green (G), and blue (B)) converted from the data binarized at the gradation lowering section 8042. More specifically, even if the difference exists in a pixel unit, the density (here, brightness value of red (R), green (G) and blue (B) as the average pixel value) in a case of averaging the values of pixels of entire plane is reserved. Therefore, the difference in density between both the multi-valued data in the entire plane is 0. Since the density preservation is made in the filtering processing shown in FIG. 15, the difference taken between the multi-valued data after the filtering and the multi-valued data before the quantizing becomes 0 as the whole plane. However, since the difference between the multi-valued data after the filtering and the multi-valued data before the quantizing can be a value other than 0 in the pixel unit, the difference has a tendency to be large in a pixel which is determined to print dot also after binarization (pixel where the binary data is "1"). By using this knowledge, it is possible to control the position of the pixel, to which a dot is printed in the data after binarization, at the plane to be quantized. Therefore, the restriction information calculation section 8044 subtracts the multi-valued data before the binarization from the multi-valued data after filtering to generate the restriction information. The generated restriction information for the plane of processing object is added to the restriction information generated at the plane so far and this added result is updated as the restriction information. It should be noted that in the processing to the two planes corresponding to two print heads of each color in the present embodiment, the restriction information is simply generated based on the binary data of the first plane.

The image distribution processing using the aforementioned restriction information in the image distribution section 8041 will be in detail explained below.

The image data distribution processing only is executed for the image data of the first plane among the image data obtained through the channel selection section 803. This distribution processing is executed to obtain about half of the value of multi-valued data of each color. That is, the distribution coefficient is set to 0.5 to obtain the multi-valued image data of the first plane.

On the other hand, in the distribution processing for the second plane, the processing similar to the image data distribution processing for the first plane described above is first executed for each color. That is, the multi-valued image data after the distributing, which is half of the value of the multi-valued data for each color, is obtained. Next, a value of the restriction information obtained in regard to the first plane is converted to be a minus value and the minus value of the restriction information is added to the multi-valued image data as the correction value for each corresponding pixel.

As described above, the binary data of the pixel defined as "1" (dot print) in the quantization result of the multi-valued data for the first plane is a value which is not 0 in the generation processing of the restriction information in regard to the object pixel and the peripheral pixels. In the processing for the second plane, this restriction information is added as a minus value to the multi-valued data of the second plane. Thereby, a value of the multi-valued data of the pixel in the second plane in which the above addition is made is made small. In regard to the pixel of the second plane the value of which is made small by the above addition, probability of becoming a binary data of "1" (dot print) in the quantization (gradation lowering) by the gradation lowering section 8042 is lower depending on the extent of the value made small. More specifically, in an arrangement of the dots printed according to the binary data of the first plane and the second plane, it is possible to control a ratio in which the dots by the first plane and the dots by the second plane are overlapped to be formed, according to the aforementioned filter calculation. As a result, the ratio of the dots formed in the overlapped manner can be restricted to be smaller as compared to the method described in Japanese Patent Laid-Open No. 2000-103088.

In this way, complementarity or exclusiveness between the planes can be controlled for each pixel by using the coefficients in the filter calculation explained in FIGS. 14 and 15. In addition, a size (filter size) of the area where the coefficients are arranged in the filter calculation also may affect the complementarity between the planes. Further, the coefficients of the filter may be appropriately defined, for example, according to the content of the image to be printed, including an event that all the coefficients of the peripheral pixels other than the object pixel are made 0.

In a case of dividing the image data into two planes at the image distribution section 8041, in regard to the restriction information obtained relating to the image data of the first plane, the multi-valued data after the filtering may be stored in the print quantity buffer 8043 as the restriction information with no change. The result found by subtracting the restriction information of the first plane from the image data (distribution coefficient 1.0) before distribution at the image distribution section 8041 is used as the image data of the second plane after the distribution. This is because the restriction information is obtained by subtracting the multi-valued data found by multiplying the image data before the distribution by the distribution coefficients of the first plane, from the multi-valued data after filtering. More specifically, the image distribution section 8041 converts the restriction information obtained in regard to the first plane to a minus value and adds the minus value to the multi-valued data found by multiplying the image data before the distribution by the distribution coefficients for the second plane, as the correction value for each corresponding pixel. Here, when the restriction information is replaced, the image distribution section 8041 adds the multi-valued data found by multiplying the image data before the distribution by the distribution coefficients for the first plane, to the multi-valued data found by multiplying the image data before the distribution by the distribution coefficients for the second planes. In addition, from the above result, the multi-valued data after filtering obtained in regard to the first plane is subtracted. Further, the multi-valued data found by multiplying the image data before the distribution by the distribution coefficients in the first planes is added to the multi-valued data found by multiplying the image data before the distribution by the distribution coefficients in the second planes. Thereby, since the image data before the distribution (distribution coefficient 1.0) is made, the image distribution section 8041 may only subtract the multi-valued data after filtering obtained at the first plane from the multi-valued data before the distribution in regard to the second plane.

As described above, a ratio of the pixels where the dots formed by plural print heads or plural times of scans are overlapped to be printed can be restricted to be small. As a result, without providing the pixels where the dots are overlapped to be printed more than needed, it is possible to appropriately restrict the density fluctuation due to the printing position shift between the planes or the like.

As described above, for restricting the density fluctuation due to the printing position shift between the planes, no complementary relation of the dots with each other between the planes, that is, existence of the pixels where the dots are overlapped to be printed between the planes is effective. However, such pixels are not so much necessary. This is because when such pixels exist too many, the coverage is reduced and decrease of the density is rather invited. As in the case of the present embodiment, the ratio of the pixels where the dots are overlapped to be printed between the planes can be restricted to be small. Therefore, without providing the pixels where the dots are overlapped to be printed more than needed, it is possible to appropriately restrict the density fluctuation also.

It should be noted that at the processing of reflecting the result of the gradation lowering in the aforementioned other plane, the gradation lowering of the first plane is executed by a method where the dots are arranged to disperse appropriately, thereby making it possible to appropriately disperse the dot arrangement of the plane where the result of the quantization is reflected. Appropriate dispersion of the dot arrangement means that a low frequency component in the space frequency measured in regard to the dot arrangement is low and can be realized by any of conventionally known methods. In general, when the print position is shifted between planes, a texture due to the dot arrangement in the individual plane is confirmed and this texture is possibly recognized as a harmful effect of an image. However, when the arrangement of the dots in each plane is appropriately dispersed as described above, even if the shift between the planes is generated, it is difficult to be recognized as the harmful effect of the image. That is, in the image of imposing importance on uniformity, not only the density fluctuation is restricted, but also the robustness to the texture is reinforced, and therefore, a more preferable output image can be obtained.

In addition, also in the present embodiment, the load in the image processing system can be reduced by selection in response to the channel by the channel selection section 803. In a recent printing apparatus, a printing apparatus with multicolor and a wide print width of 60 inches is provided. The storage area of the print quantity buffer 8043 storing the print quantity is large in such a device, increasing the memory capacity and the cost. Therefore, in regard to the channel of the ink color in which the effect of the image distribution precedence processing is relatively small, the gradation lowering precedence processing which does not require the print quantity buffer 8043 is selected. Thereby, the print quantity buffer 804 can eliminate the capacity thereof by the corresponding quantity. In the printing apparatus where a higher-print speed is demanded, the transfer area between the gradation lowering section 8042 and the print quantity buffer 8043 and the transfer area between the print quantity buffer 8043 and the restriction information calculation section 8044 can be also reduced.

As described above, by adopting the image processing method in the present embodiment, the uniform image excellent in robustness can be outputted while restricting the load of the image processing system.

It should be noted that there is explained an example of using the multi-pass printing by two scans or the two print heads, but the present invention can be applied to a case of using many multi-pass numbers (M-pass) or many print heads without mentioning. In this case, the image distribution section 8041 distributes the inputted multi-valued image data to M pieces of planes from the first plane to the M-th plane. The gradation lowering section 8042 sequentially integrates the results by executing the gradation lowering from the first plane to the (M−1)-th plane to predetermined pixel positions in the print quantity buffer 8043. For example, in a case of executing the gradation lowering processing of the data of the M-th plane, in the pixel printed ("1") in any of the first to (M−1)-th planes, the dot is difficult to be printed by the M-th print scan. That is, in all of the first plane (first print scan) to the M-th plane (M-th print scan), M kinds of gradation lowering signals corresponding to each of the M times of print scans are outputted so that dots are printed in such a manner as to be dispersed exclusively with each other. The application order of the print quantity buffer 8043 and the restriction information calculation section 8044 may be reversed. In this case, the restriction information calculation section 8044 sequentially integrates the results by executing the filtering processing from the first plane to the (M−1)-th plane to predetermined pixel positions in the print quantity buffer 8043.

In addition, in the third embodiment, the filter used at the restriction information calculation section 8044 is, as shown in FIG. 14A, an isotropic weighted average filter having the area of 3 pixels×3 pixels and in which the coefficients are arranged concentrically, but is not limited thereto. A wider square having an area of 5 pixels×5 pixels or 7 pixels×7 pixels may be used, but an an1sotropic filter having an area of 5 pixels×7 pixels or 5 pixels×9 pixels and in which filter coefficients are arranged elliptically may be used. The filter having band pass characteristics or bypass characteristics may be used instead of the form of the filter having the robustness.

Further, the present embodiment is, in the same way as the first embodiment, constructed so that the channel selection section 803 selects the subsequent processing in accordance with the set ink color among plural channels for processing the image data, but is not limited thereto. When the subsequent processing may be selected in accordance with the set ink ejection amount as in the case of the second embodiment or the subsequent processing may be selected in accordance with the ink color and the ink ejection amount, the similar effect can be obtained.

Among the respective embodiments explained above, each of the first and second embodiments explains the serial type printing apparatus, the third embodiment explains the full line type printing apparatus, but the processing methods of all the embodiments can be appropriately applied to the full line type or the serial type printing apparatus. In addition, in all the embodiments, the printing apparatus with the inkjet system is used, but the present invention is not limited to such a device. Any printing apparatus with a dot alignment system having plural printing elements for printing dots on the print medium and with a dot alignment system expressing an image by the arrangement of the dots can suitably adopt the present invention.

In addition, in the above embodiments, the image processing apparatus executing the featuring image processing of the present invention is explained taking the printing apparatus having the image processing function as an example, but the present invention is not limited to such a construction. The present invention may be constructed so that the image processing is executed by the host apparatus and the print data after gradation lowering are input to the printing apparatus. In addition, the present invention may be constructed so that an image photographed by a digital camera or the like or a graphic image is directly input to a printing apparatus without through a host apparatus and all of the image processing including the processing explained in the above embodiments are executed by the printing apparatus. In the former case, the host apparatus serves as the image processing apparatus in the present invention and in the latter case, the printing apparatus serves as the image processing apparatus in the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-329966, filed Dec. 25, 2008, which is hereby incorporated by reference herein in its entirety.

What is claimed is:

1. An image processing apparatus comprising:
    an input unit configured to input M-valued image data, where M is an integer equal to or greater than 3;
    a first processing unit configured to divide the M-valued image data inputted by the input unit into a plurality of pieces of M-valued dividing image data for printing an image on a same area of a print medium through a plurality of printing steps and to convert each of the pieces of the M-valued dividing image data into N-valued dividing image data, where N is an integer equal to or greater than 2, and N is less than M;
    a second processing unit configured to convert the M-valued image data inputted by the input unit into N-valued image data and to divide the N-valued image data into a plurality of pieces of N-valued dividing image data for printing an image on a same area of a print medium through a plurality of printing steps; and
    a selecting unit configured to select whether the M-valued image data is to be processed by the first processing unit or by the second processing unit depending on a type of M-valued image data inputted by the input unit.

2. An image processing apparatus as claimed in claim 1, wherein the first processing unit corrects one piece of the M-valued image data based on the N-valued dividing image data corresponding to another piece of the M-valued image data.

3. An image processing apparatus as claimed in claim 1, wherein the type of the M-valued image data is a color of a recording agent used for printing.

4. An image processing apparatus according to claim 3, wherein the selecting unit selects the first processing unit in a case where a density of color of the recording agent is high or a brightness of color of the recording agent is low.

5. An image processing apparatus as claimed in claim 1, wherein the type of the M-valued image data is an amount of a recording agent used for printing.

6. An image processing apparatus according to claim 5, wherein the selecting unit selects the first processing unit in a case where the amount of the recording agent is large.

7. An image processing apparatus as claimed in claim 1, further comprising:
    a printing unit configured to perform a plurality of scans of a print head to the same area of the print medium to perform printing, in accordance with the N-valued dividing image data obtained by the first processing unit or the second processing unit.

8. An image processing apparatus as claimed in claim 1, further comprising:
    a printing unit configured to perform a scan of a plurality of lines of nozzles for ejecting a same color of ink to a same area of the print medium to perform printing, in accordance with the N-valued dividing image data obtained by the first processing unit or the second processing unit.

9. A method of processing image data, comprising:
    an input step of inputting M-valued image data, where M is an integer equal to or greater than 3;

a processing step of (i) in a case where a type of the inputted M-valued image data is a first type, dividing the inputted M-valued image data into a plurality of pieces of M-valued dividing image data and converting each of the pieces of the M-valued dividing image data into N-valued dividing image data, where N is an integer equal to or greater than 2, and N is less than M, and (ii) in a case where the type of the inputted M-valued image data is a second type, converting the inputted M-valued image data into N-valued image data and dividing the N-valued image data into a plurality of pieces of N-valued dividing image data for printing an image on a same area of a print medium through a plurality of printing steps.

10. A method of processing image data according to claim 9, wherein the type of the inputted M-valued image data is a color of a recording agent used for printing.

11. A method of processing image data according to claim 10, wherein a density of color of a recording agent corresponding to the first type is higher than a density of color a recording agent corresponding to the second type.

12. A method of processing image data according to claim 10, wherein a brightness of color of a recording agent corresponding to the first type is lower than a brightness of color of a recording agent corresponding to the second type.

13. A method of processing image data according to claim 9, wherein the type of the inputted M-valued image data is an amount of a recording agent used for printing.

14. A method of processing image data according to claim 13, wherein an amount of a recording agent corresponding to the first type is larger than an amount of recording agent corresponding to the second type.

15. A non-transitory computer-readable storage medium storing a computer-executable program for performing the method of processing image data according to claim 9.

* * * * *